US007054551B2

(12) United States Patent
Liao et al.

(10) Patent No.: US 7,054,551 B2
(45) Date of Patent: May 30, 2006

(54) MULTI-FUNCTION BUTTON WITH MODE SELECTION

(75) Inventors: Chi-Yu Liao, Taipei (TW); Jih-Yung Lu, Sanchong (TW)

(73) Assignee: BENQ Corporation, Taoyuan (TW)

( * ) Notice: Subject to any disclaimer, the term of this patent is extended or adjusted under 35 U.S.C. 154(b) by 121 days.

(21) Appl. No.: 10/885,331

(22) Filed: Jul. 6, 2004

(65) Prior Publication Data

US 2005/0002664 A1 Jan. 6, 2005

(30) Foreign Application Priority Data

Jul. 4, 2003 (TW) .............................. 92212335 U

(51) Int. Cl.
*G03B 17/00* (2006.01)
*H01H 19/14* (2006.01)

(52) U.S. Cl. ...................... 396/299; 396/543; 348/373; 200/11 R; 200/336; 200/571; 116/213; 116/309

(58) Field of Classification Search ................ 396/299, 396/543; 200/564, 565, 570, 571, 11 R, 200/11 TW, 336; 116/213, 309, 310, 311, 116/312, 315

See application file for complete search history.

(56) References Cited

U.S. PATENT DOCUMENTS

| | | | | |
|---|---|---|---|---|
| 3,964,082 | A * | 6/1976 | Mita | 396/299 |
| 6,067,424 | A * | 5/2000 | Shono | 396/297 |
| 6,930,726 | B1 * | 8/2005 | Nagai | 348/373 |
| 2005/0094995 | A1 * | 5/2005 | Cheng | 396/543 |
| 2005/0145466 | A1 * | 7/2005 | Wang | 200/11 R |

* cited by examiner

*Primary Examiner*—W. B. Perkey
(74) *Attorney, Agent, or Firm*—Snell & Wilmer L.L.P.

(57) ABSTRACT

A mode selection device and a multi-function button containing such a device are provided. The mode selection device includes a case, a chassis and a dial. The case has a hole; the chassis, lying under the case, includes a latch and a set of slots. The latch is between the slots. The dial, installed in the hole, includes a recess and a set of protuberances corresponding to the slots. The recess is located in the center of the dial. The protuberances are located under the dial and engage with the slots. When the latch engages with an edge of the dial, the latch, the slots and the protuberances together keep the relative position between the dial and the chassis unchanged.

12 Claims, 6 Drawing Sheets

MULTI-FUNCTION BUTTON WITH MODE SELECTION

CROSS-REFERENCE TO RELATED APPLICATION

This Application claims priority to Taiwan Patent Application No. 092212335 filed on Jul. 4, 2003.

FIELD OF INVENTION

The present invention relates to a mode selection apparatus and a multi-function button containing the mode selection apparatus.

BACKGROUND OF THE INVENTION

Electronic devices employ various types of input devices. One of the most popular ones is the button. A simple button provides the function of inputting a single piece of information, such as a number, a letter, or a pre-determined command.

As the functions of electronic devices multiply, simple buttons no longer meet the challenging demands. Therefore, a composite key 100 shown in FIG. 1*a* has been proposed. The key includes, as shown in FIG. 1*b*, a chassis 110, a locking device 120, a case 130, a dial 140 and a button 150. There is a hole 131 on the case 130. The locking device 120 includes an elastic component 121 and a brush 123. Screws 122 lock together the elastic component 121, the case 130, and the dial 140, which pass through the hole 131. There is a recess 141 in the center of the dial 140. The button 150 is disposed in the recess 141, and both come together with the chassis 110 to form the key 100.

Due to the locking restriction of the screws 122, the composite key 100 can only be assembled vertically. This must be taken into consideration when designing any electronic device that uses this composite key 100.

Besides, the large number of components of the composite key 100 presents a disadvantage when it comes to production cost and assembly. Therefore, the present invention discloses a mode selection apparatus with fewer components and no restriction on the assembly direction, as well as a composite key containing the mode selection apparatus.

SUMMARY OF THE INVENTION

One aspect of the present invention provides a mode selection apparatus and a composite key containing the mode selection apparatus. They overcome the problems of conventional key by adopting a structure different from that used in the prior art.

Another aspect of the present invention provides a mode selection apparatus that provides equivalent function with fewer components, and a composite key containing the mode selection apparatus.

Still another aspect of the present invention provides a mode selection apparatus and a composite key containing the mode selection apparatus that have the advantages of reducing production time and cost, and yielding better output.

The present invention therefore discloses a mode selection apparatus, which is usually used in a composite key. Generally speaking, the mode selection apparatus of the present invention includes a case, a chassis and a dial. The case has a hole for placing the assembled chassis and dial. The chassis beneath the case includes a set of slots and a latch between the slots. The dial positioned in the hole includes a recess and a set of protuberances corresponding to the slots. The recess is in the center of the dial, and the protuberances are beneath the dial and can engage with the slots. Optionally, the mode selection apparatus may further include a button placed in the recess of the dial.

When the mode selection apparatus of the present invention is assembled, the case is under the dial and between the dial and the chassis. When the latch on the chassis engages with an edge of the dial, the latch, the set of slots and the set of protuberances together keep the relative position of the dial and the chassis unchanged, and render the dial which is engaged with the chassis to pass through and to be placed in the hole on the case.

The figures of the invention and the following descriptions may facilitate persons skilled in the art to understand the objects and the advantages of the present invention better.

DETAILED DESCRIPTION

The present invention provides a mode selection apparatus, and a composite key containing the mode selection apparatus. The mode selection apparatus, preferably, is used in a variety of electronic devices, including but not restricted to, cameras, especially digital ones, mobile communication devices, computers, and remote controls. However, the device for inputting information may be used in any other type of keys, as long as they simultaneously have both the mode selection and key functions.

Figure 1A:
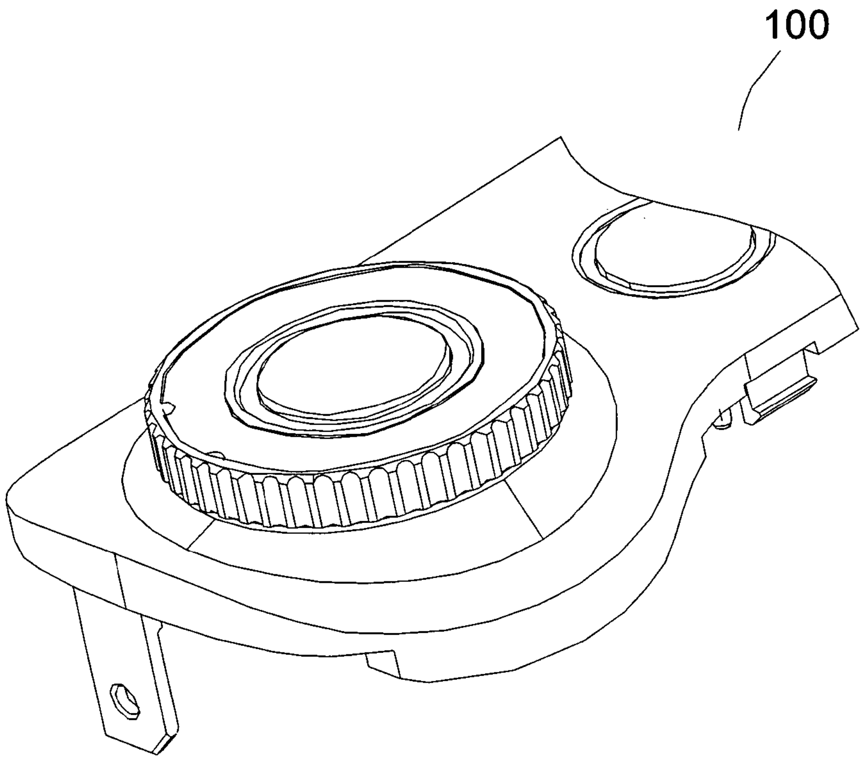
Fig.1a(Prior Art)
FIGS. 1*a* and 1*b* show a conventional composite key.
Figure 1B:
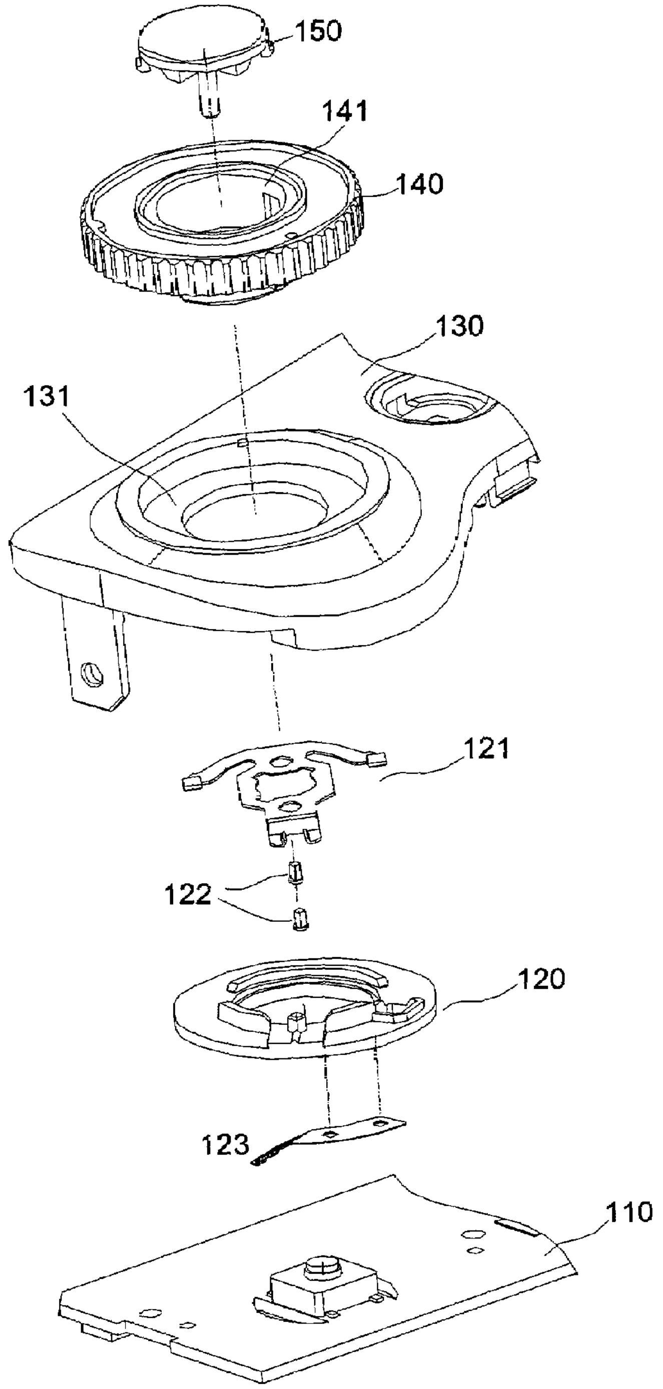
Fig.1b(Prior Art)
Figure 2:
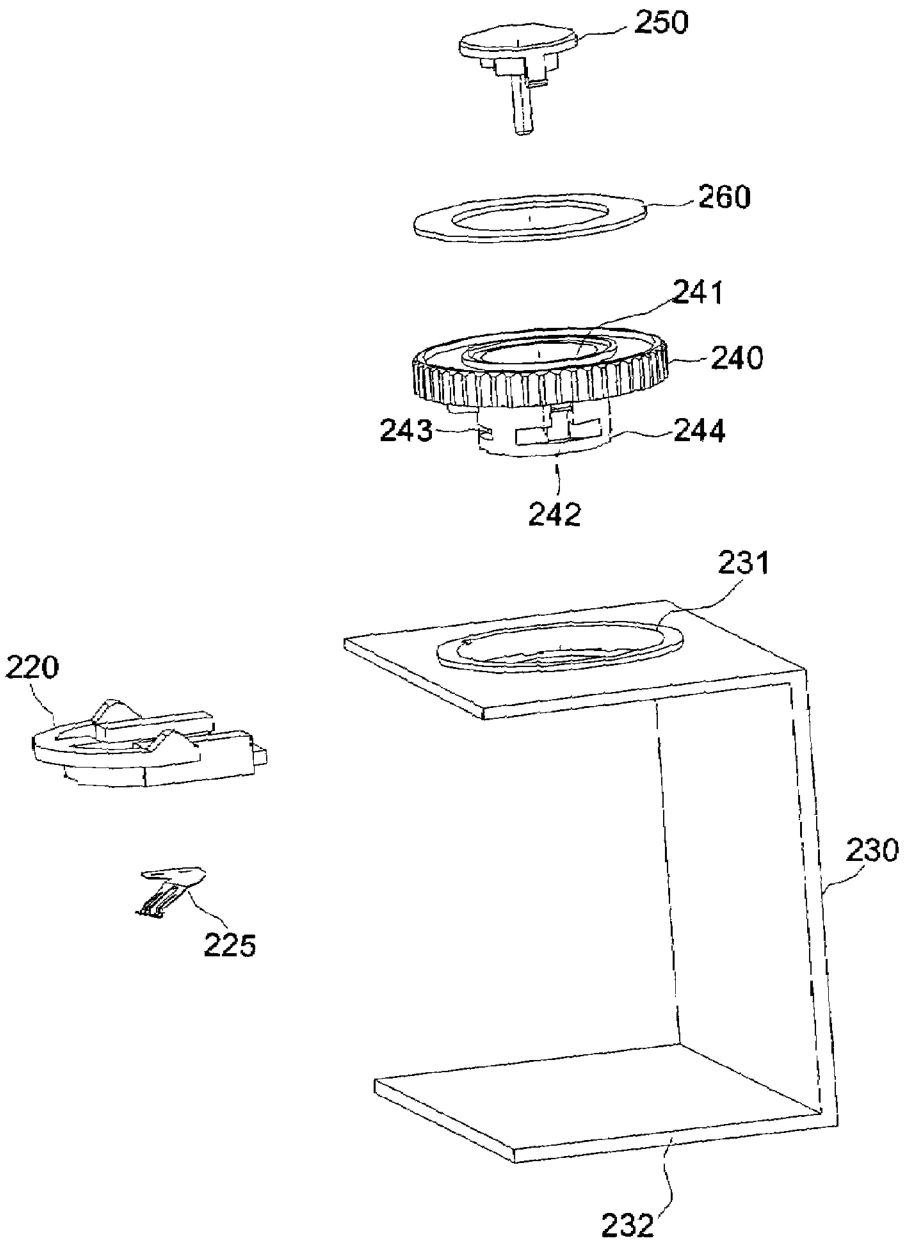
FIG. 2 is an explosive view of a preferred embodiment of the mode selection apparatus of the present invention.

FIG. 2 is an explosive view of a preferred embodiment of the mode selection apparatus of the present invention. The mode selection apparatus includes a case 230, a chassis 220 and a dial 240. The case 230 has a hole 231 for placing the assembled chassis 220 and dial 240. Optionally, part of the case 230 can be extended as wall 232 to right beneath the hole 231 and substantially shields the hole 231 therefrom. The dial 240 which may be positioned in the hole 231 includes a recess 241 and a set of protuberances 242. The term "a set of" or "the set of" used in this embodiment means "two." The recess 241 is in the center of the dial 240, and the protuberances 242 are beneath the dial 240. Additionally, below the dial 240 are a cavity 243 and an edge 244.

Figure 3:
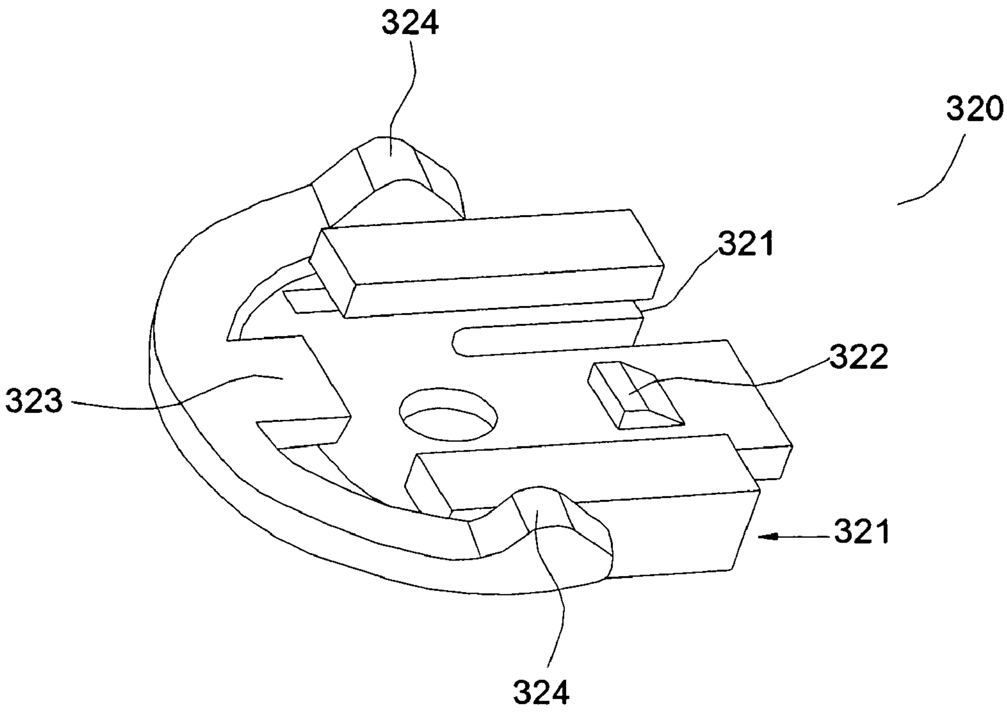
FIG. 3 is a perspective view of a preferred embodiment of the chassis of the present invention.

Please refer to both FIG. 2 and FIG. 3. The set of protuberances 242 on the dial 240 corresponds to and engages with a set of slots 321 on the chassis 320. When the protuberances 242 completely engage within the slots 321, the protuberances 242 and the slots 321 then join together to keep the relative position of the dial 240 and the chassis 220 unchanged.

The mode selection apparatus of the present invention may preferably further include a button 250, which is placed in the recess 241 of the dial 240. Optionally, between the button 250 and the dial 240, the mode selection apparatus may further include a ring 260 for decoration.

In order to complete the functions of the mode selection apparatus, under the chassis 220 is a brush 225. It may selectively connect electrically to a printed circuit board (not shown) to provide the mode selection function in response to a user's action.

For the detailed structure of the chassis 220, please refer to FIG. 3. It includes a set of slots 321, and a latch 322 between the slots 321. The set of protuberances 242 on the dial 240 corresponds to and engages with the slots 321 on chassis 320. In addition, the chassis 320 preferably further includes a boss 323 corresponding to cavity 243 under dial 240 as well as a pair of bulges 324.

Please refer to both FIG. 2 and FIG. 3. When the mode selection apparatus of the present invention is being assembled, the chassis 220 may horizontally connect to the dial 240 previously positioned in the hole 231. During the assembly process, the protuberances 242 on the dial 240 correspond to and engage with the slots 321 on the chassis 220. After the protuberances 242 completely engage with the slots 321, the latch 322 locks into an edge 244 on the dial 240. At this point, the boss 323 enters and is disposed in the cavity 243 on the dial 240. Once the protuberances 242 completely engage with the slots 321, the latch 322, the slots 321, the protuberances 242, the boss 323, and the cavity 243 together keep the relative position of the dial 240 and the chassis 220 unchanged, and form a sandwich structure along with the case 230.

Figure 4:
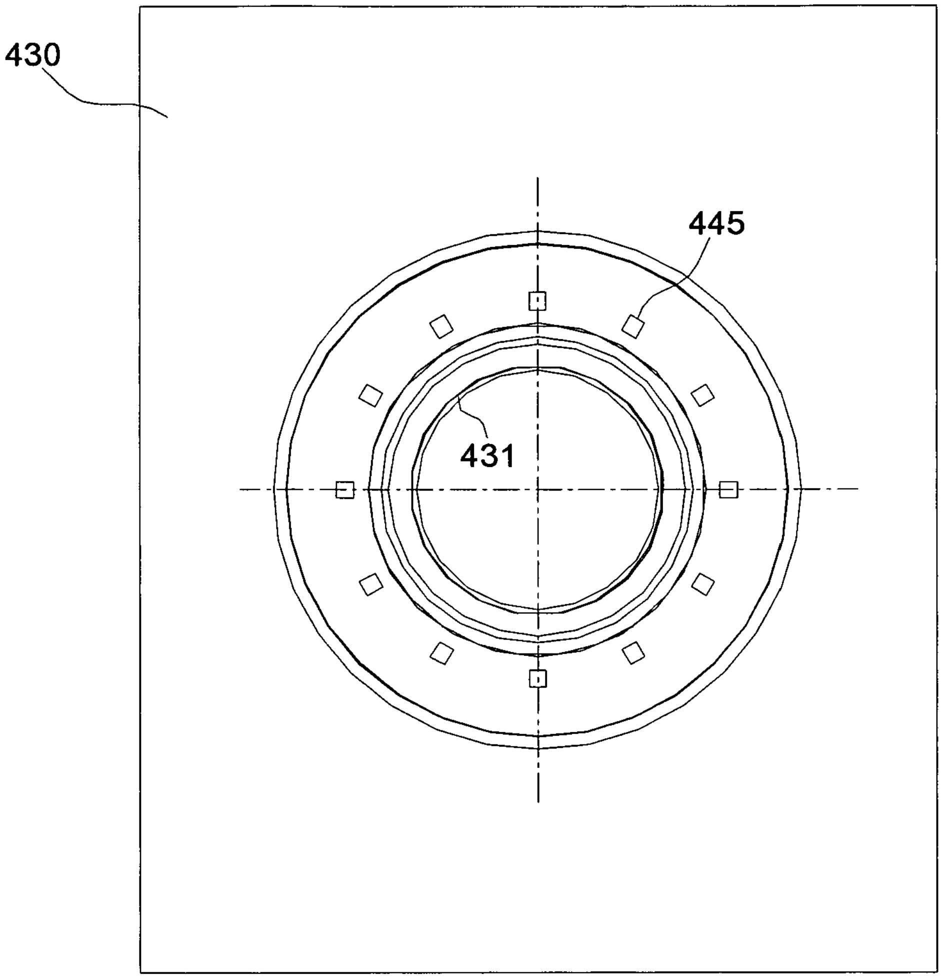
FIG. 4 is a bottom view of a preferred embodiment of the hole of the present invention.

Case 430, on its inner surface as shown in FIG. 4, has a plurality of pits 445 annularly arranged along the edge of the hole 431. The chassis 320 further has a set of projections 323 corresponding to the pits 445. Once the chassis 320 engages with the dial 240, the projections 323 may movably and individually engage with each of the pits 445 in response to a user's action, which causes the stepwise movement of the dial 240 under the selection mode.

The number of the pits 445 under the hole 431, preferably between 2 and 24, more preferably between 4 and 20, and further preferably between 6 and 18, is at the discretion of persons skilled in the art when practicing the present invention.

Figure 5A:
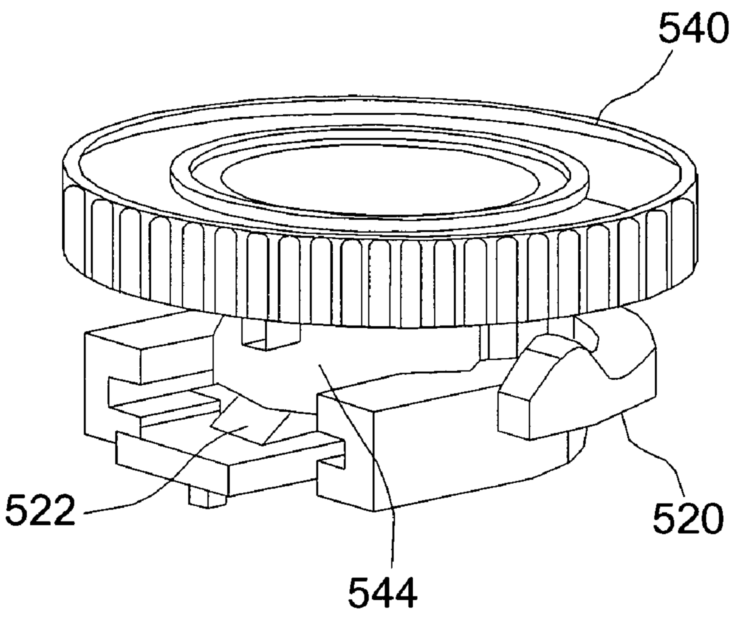
FIG. 5*a* is a perspective view showing the chassis alone engaging with the dial.

FIG. 5*a* shows that chassis 520 engages with dial 540 alone. Latch 522 on the chassis 520 engages with an edge 544 of the dial 540. The latch 522 may move downwards sufficiently so as to disengage itself from the edge 544. Afterwards, the latch 522 may completely disengage itself from the edge 544 by moving in the reverse direction.

Figure 5B:
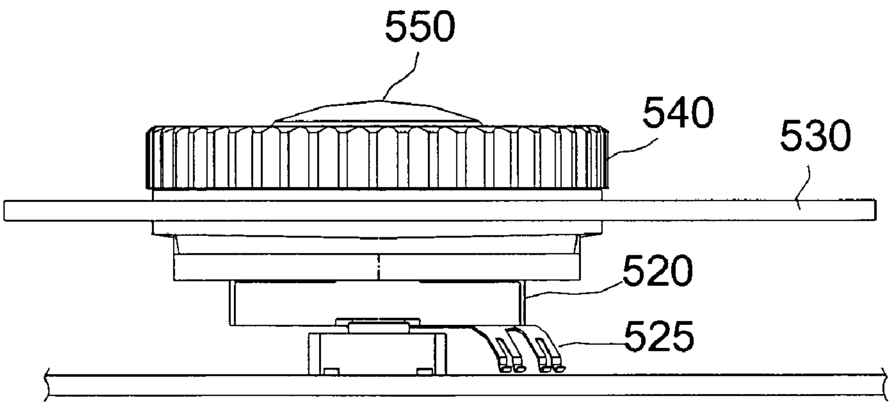
FIG. 5*b* is a side view of all the components in FIG. 2 joined together.

FIG. 5*b*, showing the side view of FIG. 2 when all parts are assembled, illustrates case 530, chassis 520, brush 525, dial 540 and button 550.

By means of the detailed descriptions of what is presently considered to be the most practical and preferred embodiments of the subject invention, it is the expectation that the features and the gist thereof are plainly revealed. Nevertheless, these above-mentioned illustrations are not intended to be construed in a limiting sense. Instead, it should be well understood that any analogous variation and equivalent arrangement is supposed to be covered within the spirit and scope to be protected and that the interpretation of the scope of the subject invention would therefore as much as broadly apply.

The invention claimed is:

1. A mode selection apparatus, comprising:

a case, having a hole;

a chassis, disposed beneath the case, the chassis comprising a latch and a set of slots, wherein the latch is between the set of slots; and a dial, disposed in the hole, the dial comprising a recess and a set of protuberances corresponding to the set of slots, wherein the recess is in the center of the dial, and the set of protuberances are beneath the dial and engage with the set of slots;

wherein when the latch engages with a rim of the dial, the latch, the set of slots and the set of protuberances join together to keep the relative position of the dial and the chassis unchanged.

2. The mode selection apparatus of claim 1, wherein a part of an extension of the case is right beneath the hole and substantially shields the hole.

3. The mode selection apparatus of claim 1, wherein the case further has a plurality of pits annularly arranged along an edge of the hole; the chassis further has a set of projections corresponding to the pits; the set of projections movably and individually engage with the pits in response to a user's action.

4. The mode selection apparatus of claim 1, wherein the chassis further has a brush performing a mode selection in response to a user's action.

5. The mode selection apparatus of claim 1, wherein the latch disables an engagement with the dial when the latch moves downwards by a sufficient distance.

6. The mode selection apparatus of claim 1, further comprising a button disposed in the recess.

7. A multi-function button, comprising a mode selection apparatus comprising:

a case, having a hole;

a chassis, disposed beneath the case, the chassis comprising a latch and a set of slots, wherein the latch is between the set of slots; and a dial, disposed in the hole, the dial comprising a recess and a set of protuberances corresponding to the set of slots, wherein the recess is in the center of the dial, and the pair of protuberances are beneath the dial and engage with the set of slots;

wherein when the latch engages with a rim of the dial, the latch, the set of slots and the set of protuberances join together to keep the relative position of the dial and the chassis unchanged.

8. The multi-function button of claim 7, wherein a part of an extension of the case is right beneath the hole and substantially shields the hole.

9. The multi-function button of claim 7, wherein the case further has a plurality of pits annularly arranged along an edge of the hole; the chassis further has a set of projections corresponding to the pits; the set of projections movably and individually engages with the pits in response to a user's action.

10. The multi-function button of claim 7, wherein the chassis further has a brush performing a mode selection in response to a user's action.

11. The multi-function button of claim 7, wherein the latch disables an engagement with the dial when the latch moves downwards by a sufficient distance.

12. The multi-function button of claim 7, further comprising a button displaced in the recess.

* * * * *